United States Patent
Chang et al.

(10) Patent No.: US 11,519,380 B1
(45) Date of Patent: Dec. 6, 2022

(54) SEA WAVE GENERATING DEVICE

(71) Applicant: National Kaohsiung University of Science and Technology, Kaohsiung (TW)

(72) Inventors: Hsiang-Tang Chang, Kaohsiung (TW); Ssu-Kai Chiu, Kaohsiung (TW); Yi-Chen Liu, Kaohsiung (TW)

(73) Assignee: National Kaohsiung University of Science and Technology, Kaohsiung (TW)

( * ) Notice: Subject to any disclaimer, the term of this patent is extended or adjusted under 35 U.S.C. 154(b) by 0 days.

(21) Appl. No.: 17/540,402

(22) Filed: Dec. 2, 2021

(51) Int. Cl.
*F03B 13/22* (2006.01)

(52) U.S. Cl.
CPC .......... *F03B 13/22* (2013.01); *F05B 2240/14* (2013.01); *F05B 2260/404* (2013.01); *F05B 2260/4031* (2013.01)

(58) Field of Classification Search
CPC .................. F03B 13/22; F05B 2240/14; F05B 2260/4031; F05B 2260/404
See application file for complete search history.

(56) References Cited

U.S. PATENT DOCUMENTS

2019/0271293 A1* 9/2019 Carter .................. H02K 7/1823

* cited by examiner

*Primary Examiner* — Viet P Nguyen
(74) *Attorney, Agent, or Firm* — Karin L. Williams; Alan D. Kamrath; Mayer & Williams PC (57) ABSTRACT

A sea wave generating device includes a floating base, a generating assembly, a driving assembly, and a guiding housing. The floating base includes a base body and a cover plate. The generating assembly is secured in the base body and includes a lower magnetic wheel and a power generator. The driving assembly includes an upper magnetic wheel and a blade wheel. The upper magnetic wheel and the lower magnetic wheel are attracted magnetically. The guiding housing is secured to the base body and rests on the cover plate. The guiding housing covers the blade wheel and the upper magnetic wheel. Thus, when the sea wave is introduced into the guiding housing, the seawater pushes the blade wheel which drives the upper magnetic wheel which drives the lower magnetic wheel which drives the power generator to generate an electric power.

8 Claims, 7 Drawing Sheets

SEA WAVE GENERATING DEVICE

BACKGROUND OF THE INVENTION

1. Field of the Invention

The present invention relates to a generating device and, more particularly, to a sea wave (or ocean wave) generating device.

2. Description of the Related Art

In recent years, the climate change problem has become more serious so that it is more important to develop the renewable energy. In addition to the solar energy and the wind power, marine energy is also one of the most promising items of the renewable energy. Therefore, power generation devices that use tides, ocean waves, ocean temperature difference, salt difference or the like, as a power are constantly developed. The marine power generation devices have to withstand an impact of the sea waves, so that it is important to facilitate the operator repairing the marine power generation devices. However, it is not easy for the operator to repair or replace the conventional marine power generation devices on the sea, thereby causing disturbance to the developer.

BRIEF SUMMARY OF THE INVENTION

The primary objective of the present invention is to provide a sea wave generating device that facilitates maintenance on the sea.

In accordance with the present invention, there is provided a sea wave generating device comprising a floating base, a generating assembly, a driving assembly, and a guiding housing. The floating base includes a base body and a cover plate. The base body defines a base chamber directed upward. The cover plate is secured on a top of the base body and covers the base chamber. The generating assembly includes a frame, a lower magnetic wheel pivotally mounted on the frame, a power generator mounted on the frame, and a transmission set mounted on the frame. The frame is secured to a bottom of the base chamber. The transmission set is connected between the lower magnetic wheel and the power generator. The driving assembly includes an upper magnetic wheel pivotally mounted on a top of the cover plate, and a blade wheel secured on the upper magnetic wheel. The upper magnetic wheel is arranged above the lower magnetic wheel and is coaxial with the lower magnetic wheel. The upper magnetic wheel and the lower magnetic wheel are attracted magnetically with each other. The blade wheel is coaxial with the upper magnetic wheel. The guiding housing includes a housing body detachably secured to the base body. The housing body has an inside provided with a guiding wall. The guiding wall defines an inlet flow channel and a receiving chamber. The inlet flow channel has a first end connected to an outside of the housing body and a second end connected to the receiving chamber. The inlet flow channel tapers gradually from the outside of the housing body toward a side of the receiving chamber. The housing body has a bottom provided with multiple first outlets. The guiding wall has a bottom provided with a second outlet connected to the receiving chamber. The bottom of the housing body rests on the cover plate closely. The bottom of the guiding wall rests on the cover plate closely. The driving assembly is mounted in the receiving chamber. The blade wheel has a periphery corresponding to an intersection of the inlet flow channel and the receiving chamber.

Thus, the sea wave generating device floats on the sea to receive the sea wave. When the sea wave is introduced through the inlet flow channel into the receiving chamber, the inlet flow channel has a tapered shape to increase the flow speed of the seawater into the receiving chamber, so that the accelerated seawater impacts and drives the blade wheel which drives the upper magnetic wheel which magnetically drives the lower magnetic wheel which drives the transmission set which drives the power generator so that the power generator is operated to generate an electric power.

According to the primary advantage of the present invention, the guiding housing is removed from the floating base easily and quickly to facilitate maintenance of the sea wave generating device.

According to another advantage of the present invention, the generating assembly and the driving assembly are modularized so that the generating assembly and the driving assembly are detached, dismantled, replaced and repaired easily and conveniently.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, a sea wave generating device in accordance with the preferred embodiment of the present invention comprises a floating base 1, a generating assembly 2 mounted in the floating base 1, a driving assembly 3 mounted on the floating base 1, and a guiding housing 4 connected with the floating base 1 and covering the driving assembly 3.

The floating base 1 includes a base body (or mounting seat) 11 and a cover plate 13 mounted on the base body 11. The base body 11 defines a base chamber 12 directed upward. The cover plate 13 is secured on a top of the base body 11 and covers the base chamber 12.

The generating assembly 2 is mounted in the base chamber 12 and covered by the cover plate 13. The generating assembly 2 includes a frame 21, a lower magnetic wheel 22 pivotally mounted on the frame 21, a power generator 23 mounted on the frame 21, and a transmission set 24 mounted on the frame 21. The frame 21 is secured to a bottom of the base chamber 12 and closed by the cover plate 13. The transmission set 24 is connected between the lower magnetic wheel 22 and the power generator 23. Thus, when the lower magnetic wheel 22 is rotated, the power generator 23 is driven by the lower magnetic wheel 22. Preferably, the transmission set 24 is, but not limited to, a gear train.

The driving assembly 3 includes an upper magnetic wheel 31 pivotally mounted on a top of the cover plate 13, and a blade wheel (or an impeller) 32 secured on the upper magnetic wheel 31. The upper magnetic wheel 31 is arranged above the lower magnetic wheel 22 and is coaxial with the lower magnetic wheel 22. The upper magnetic wheel 31 and the lower magnetic wheel 22 are attracted magnetically with each other. The blade wheel 32 is coaxial with the upper magnetic wheel 31. Thus, when the blade wheel 32 is rotated, the blade wheel 32 drives and rotates the upper magnetic wheel 31 and the lower magnetic wheel 22 simultaneously.

Figure 1:
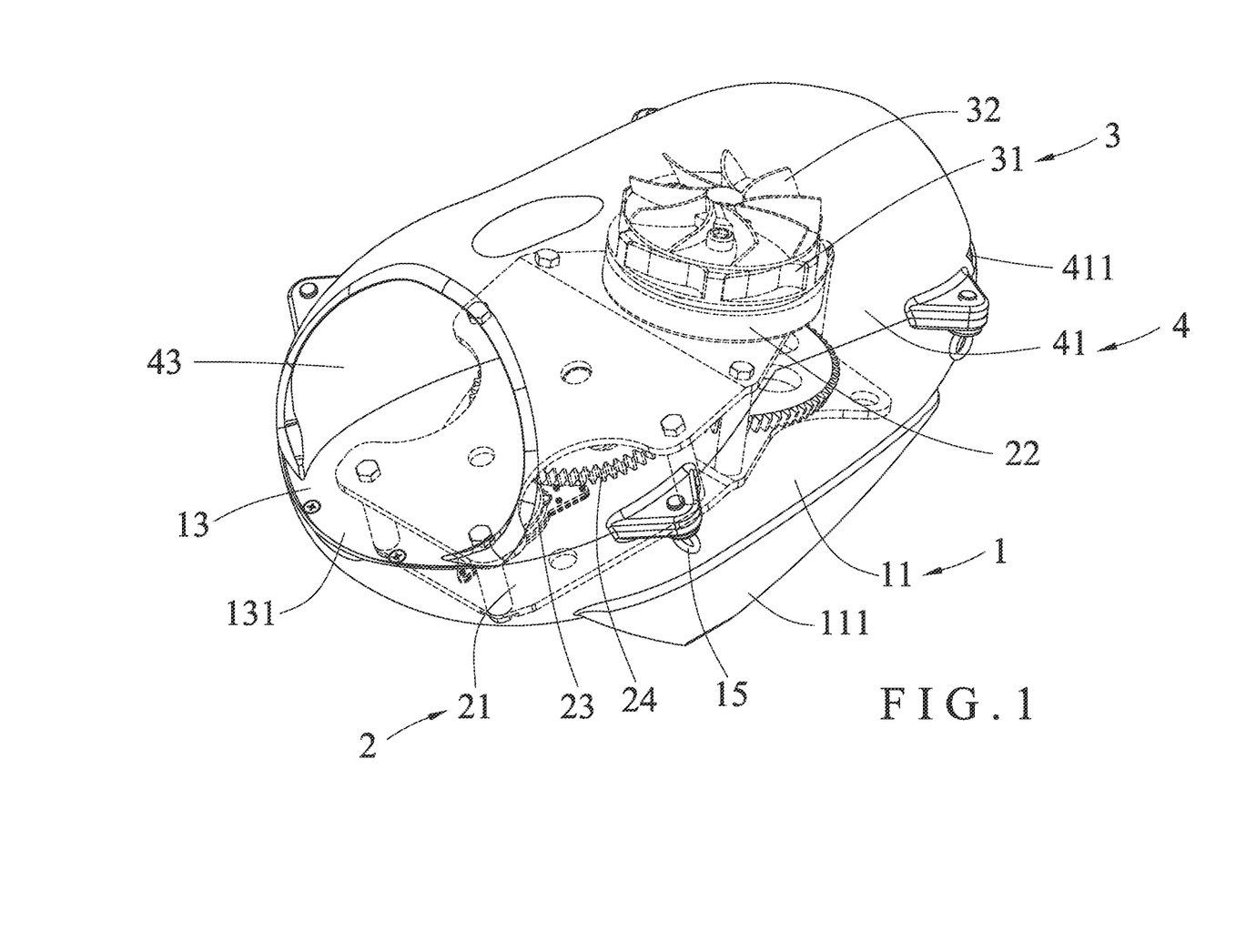
FIG. 1 is a perspective view of a sea wave generating device in accordance with the preferred embodiment of the present invention.
Figure 2:
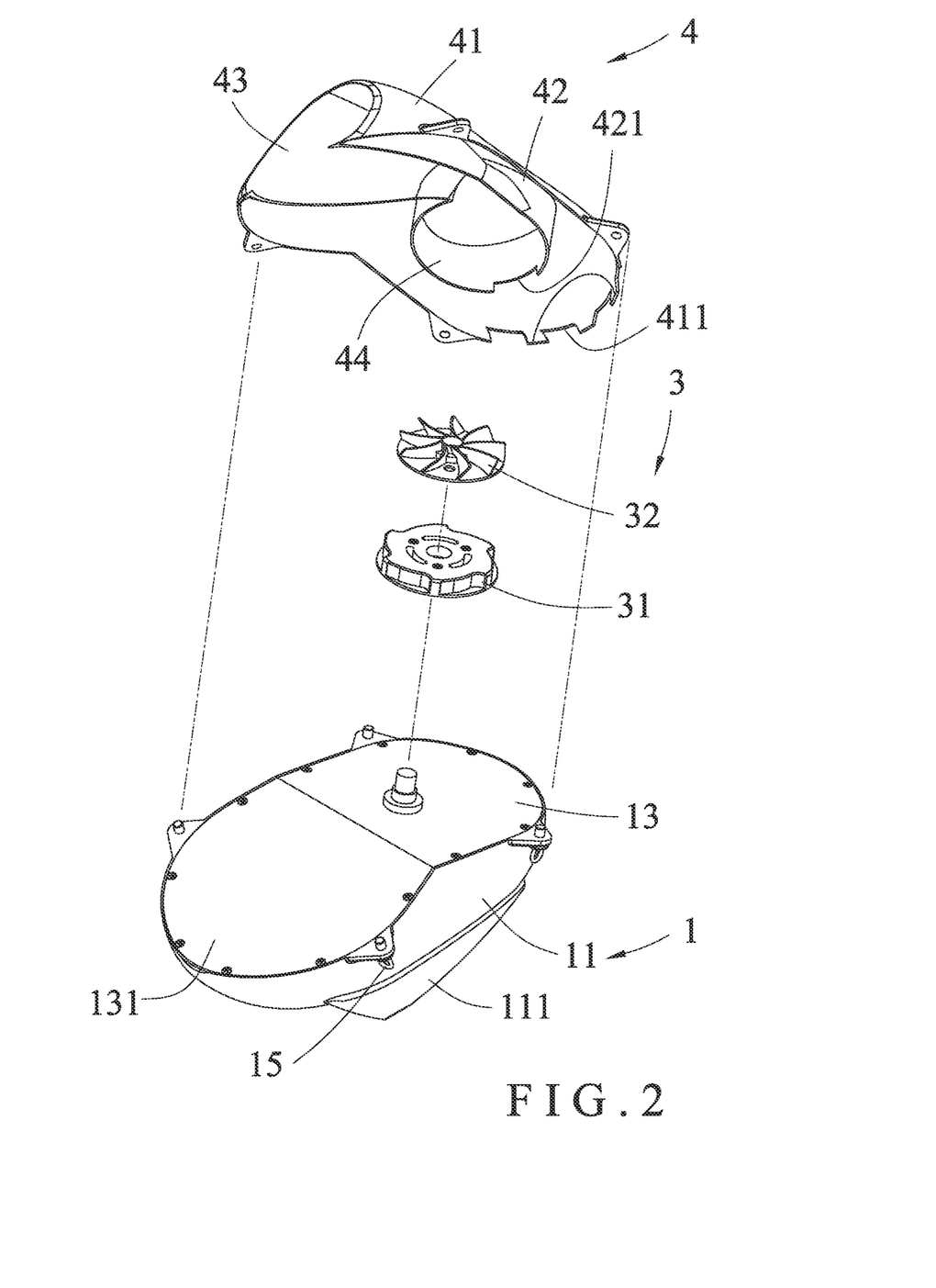
FIG. 2 is a partial exploded perspective view of the sea wave generating device in accordance with the preferred embodiment of the present invention.
Figure 3:
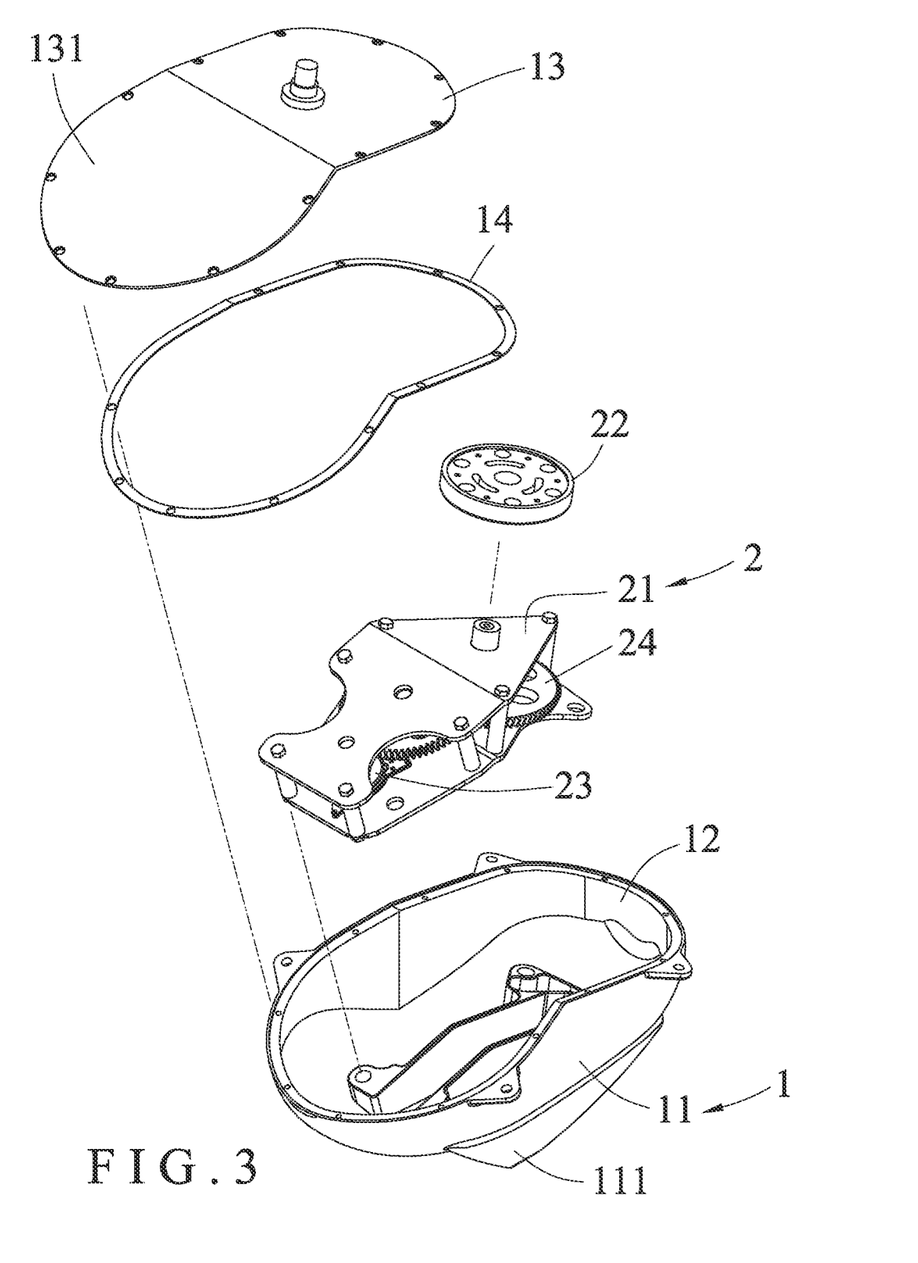
FIG. 3 is a partial exploded perspective view of the sea wave generating device in accordance with the preferred embodiment of the present invention.
Figure 4:
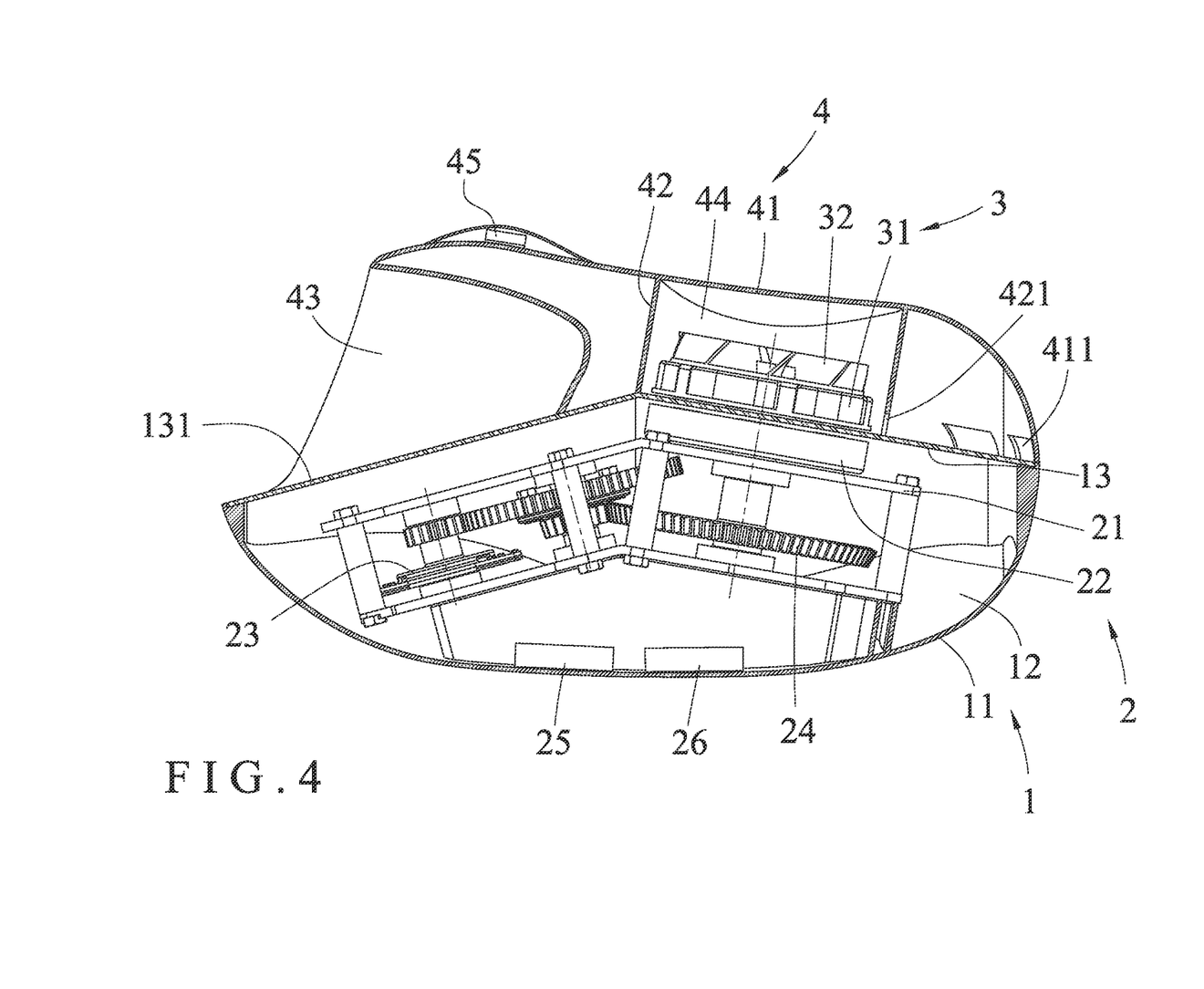
FIG. 4 is a cross-sectional view of the sea wave generating device in accordance with the preferred embodiment of the present invention.
Figure 5:
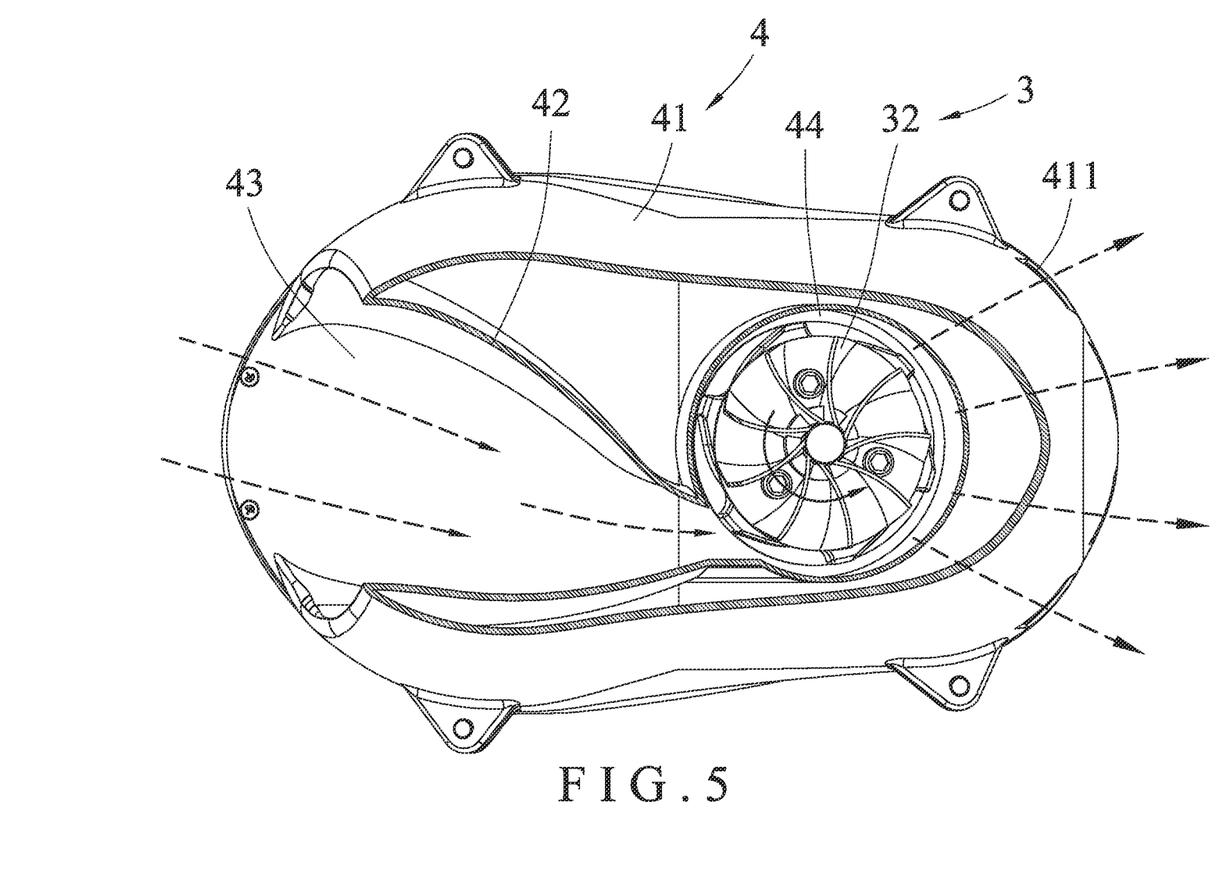
FIG. 5 is a bottom cross-sectional operational view of the sea wave generating device in accordance with the preferred embodiment of the present invention.

The guiding housing 4 includes a housing body (or cover or hood) 41 detachably secured to the base body 11 by screwing or the like. The housing body 41 has an inside provided with a guiding wall 42. The guiding wall 42 defines an inlet flow channel 43 and a receiving chamber 44. The inlet flow channel 43 has a first end connected to an outside of the housing body 41 and a second end connected to the receiving chamber 44. The inlet flow channel 43 tapers (or reduces or shrinks) gradually from the outside of the housing body 41 toward a side of the receiving chamber 44. The housing body 41 has a bottom provided with multiple first outlets 411. The guiding wall 42 has a bottom provided with a second outlet 421 connected to the receiving chamber 44. The bottom of the housing body 41 rests on the cover plate 13 closely. The bottom of the guiding wall 42 rests on the cover plate 13 closely. The driving assembly 3 is mounted in the receiving chamber 44. The blade wheel 32 has a periphery corresponding to an intersection of the inlet flow channel 43 and the receiving chamber 44 as shown in FIG. 5.

In the preferred embodiment of the present invention, the cover plate 13 is bent or has a curved shape. The cover plate 13 is provided with a flow guide (or flow entrance) face 131. The flow guide face 131 is an inclined face or curved face. The upper magnetic wheel 31 is spaced from the flow guide face 131. The bottom of the housing body 41 has a shape mating with that of the cover plate 13. The bottom of the housing body 41 is bent or has a curved shape. The bottom of the guiding wall 42 has a shape mating with that of the cover plate 13. The bottom of the guiding wall 42 is bent or has a curved shape. The inlet flow channel 43 is arranged above and aligned with the flow guide face 131. The inlet flow channel 43 has a tapering direction the same as an uphill direction of the flow guide face 131.

In the preferred embodiment of the present invention, the floating base 1 further includes a waterproof seal strip 14 secured to a bottom of the cover plate 13 and closely resting on the top of the base body 11.

In the preferred embodiment of the present invention, the base body 11 has two sides each provided with a flow guide wing (or spoiler) 111.

In the preferred embodiment of the present invention, the guiding housing 4 further includes a warning indicator 45 mounted on the housing body 41.

In the preferred embodiment of the present invention, the floating base 1 further includes multiple connectors (or couplings) 15 mounted on the base body 11.

In the preferred embodiment of the present invention, the generating assembly 2 further includes a voltage stabilizer (or regulator) 25 mounted in the base chamber 12 and an electric storage appliance 26 mounted in the base chamber 12. The voltage stabilizer 25 is electrically connected with the power generator 23 and the electric storage appliance 26.

Figure 6:
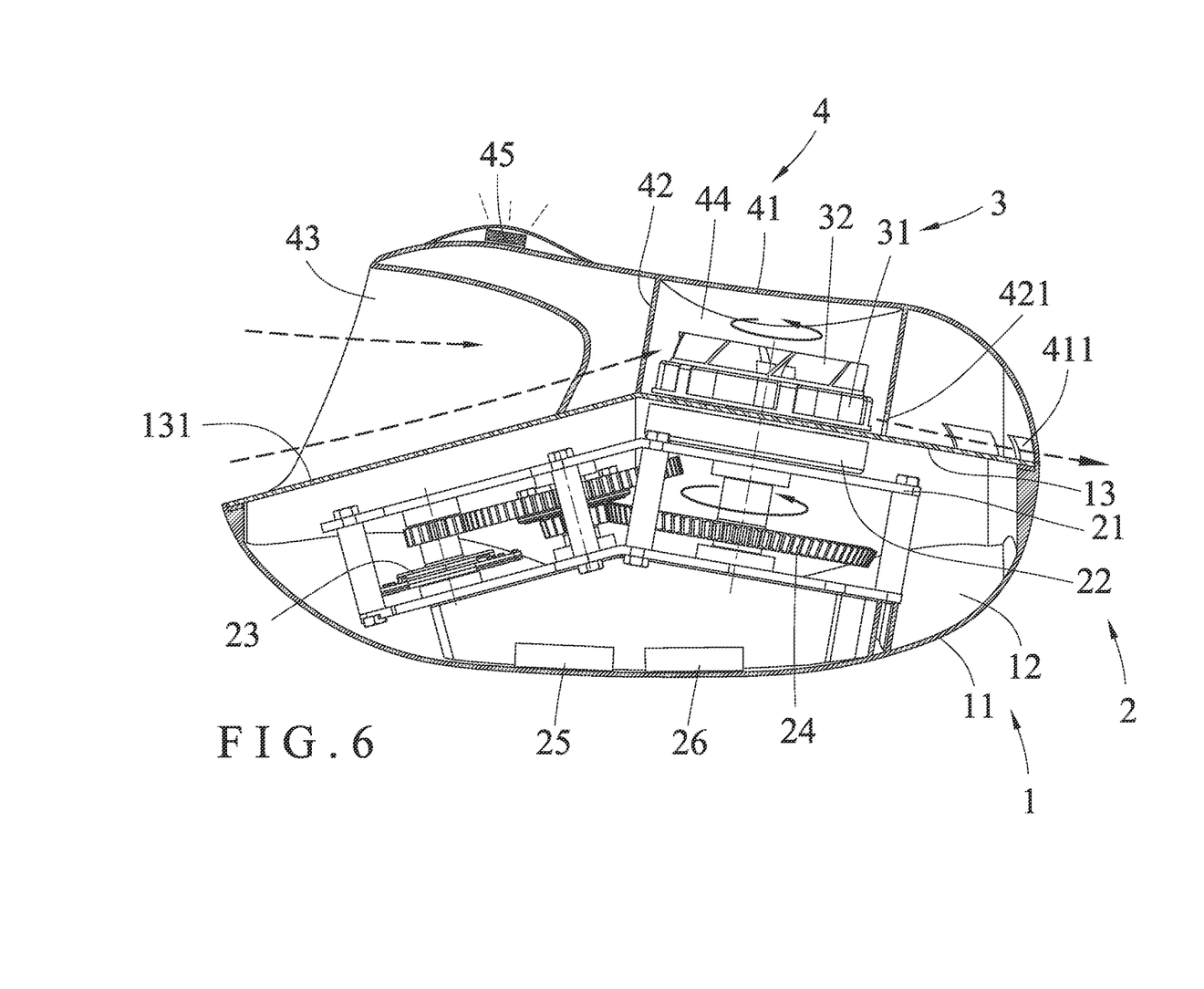
FIG. 6 is a schematic operational view of the sea wave generating device as shown in FIG. 4 in use.

In operation, referring to FIGS. 5 and 6 with reference to FIGS. 1-4, the sea wave generating device floats on the sea to receive the sea wave. At this time, the flow guide face 131 of the cover plate 13 is disposed under the sea level to assure entrance of the sea wave into the inlet flow channel 43. When the sea wave is introduced through the inlet flow channel 43 into the receiving chamber 44, the inlet flow channel 43 has a tapered shape to increase the flow speed of the seawater into the receiving chamber 44. Then, the accelerated seawater in the receiving chamber 44 impacts and drives the blade wheel 32 to rotate, so that the blade wheel 32 drives and rotates the upper magnetic wheel 31 simultaneously. The upper magnetic wheel 31 and the lower magnetic wheel 22 are attracted magnetically with each other so that when the blade wheel 32 is rotated, the upper magnetic wheel 31 and the lower magnetic wheel 22 are rotated simultaneously. Then, the lower magnetic wheel 22 is rotated to drive the transmission set 24 which drives the power generator 23 so that the power generator 23 is operated to generate an electric power. The seawater is drained outward from the first outlets 411 of the housing body 41 and the second outlet 421 of the guiding wall 42 during the process. The voltage stabilizer 25 is used to regulate the voltage of the electric power generated by the power generator 23. Then, the electric power regulated by the voltage stabilizer 25 is stored in the electric storage appliance 26.

It is appreciated that, the flow guide wings 111 of the floating base 1 are used to guide the sea current so that the inlet flow channel 43 is kept at a direction that is directed toward the sea wave.

In addition, foreign objects, such as seaweeds, marine algae or the like, easily block the inlet flow channel 43 and the receiving chamber 44 during a period of time, so that the blade wheel 32 and the upper magnetic wheel 31 are obstructed. The housing body 41 is detachably secured to the base body 11 so that the service person or repairman can remove the guiding housing 4 from the floating base 1 for maintenance so as to clean the foreign objects or replace the parts. The generating assembly 2 is sealed in the base body 11 so that the generating assembly 2 will not be interrupted or broken by the foreign objects.

Further, the warning indicator 45 of the guiding housing 4 is used to provide an optical warning effect to prevent ships from hitting the sea wave generating device during a night navigation. Further, the connectors 15 of the floating base 1 connect the base body 11 and the housing body 41 together.

Figure 7:
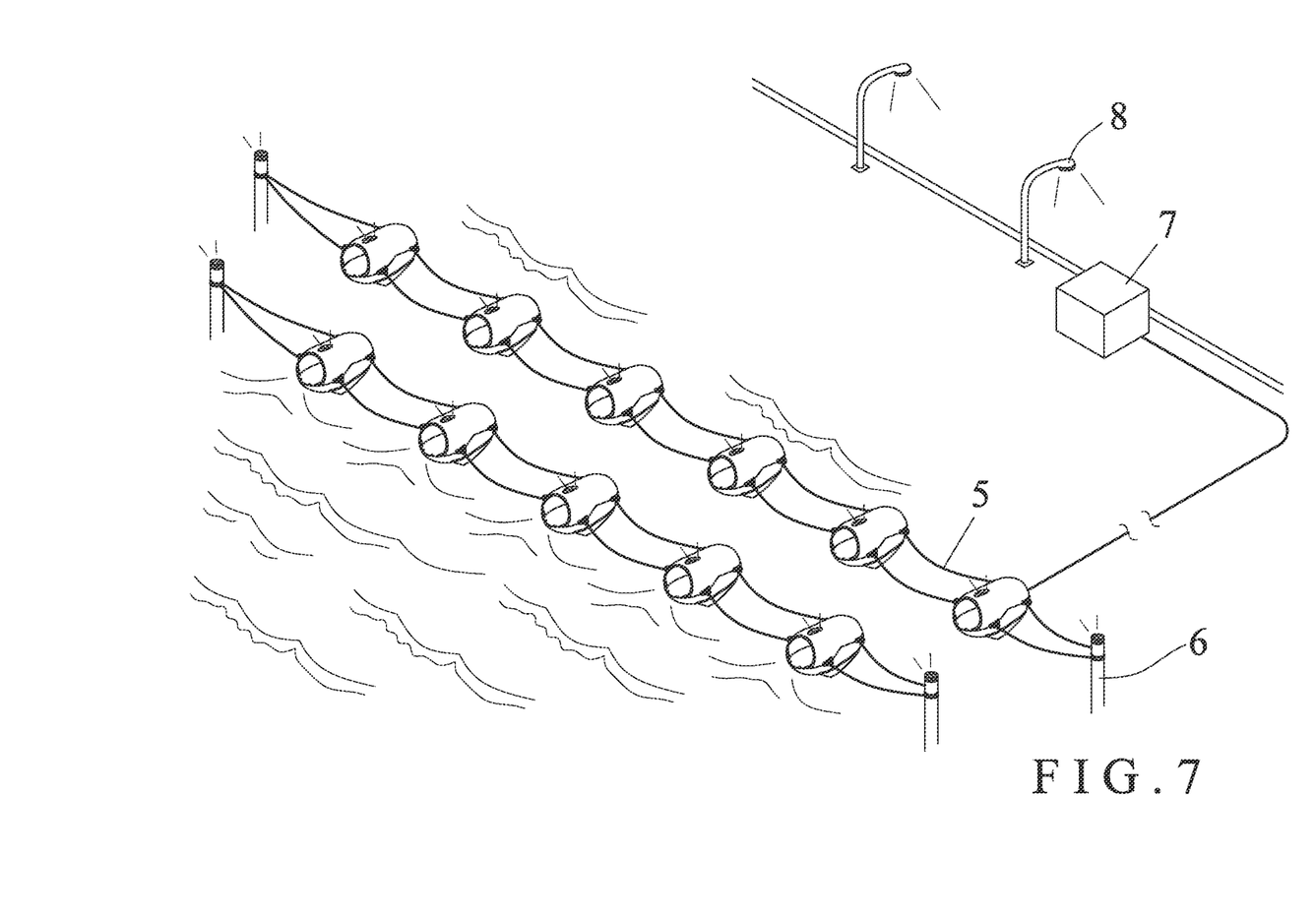
FIG. 7 is a schematic operational view showing usage of the sea wave generating device in accordance with the preferred embodiment of the present invention.

Referring to FIG. 7 with reference to FIGS. 1-6, multiple sea wave generating devices are connected by multiple connecting members 5 which fasten and connect the connectors 15 of the multiple sea wave generating devices. Besides, the multiple connecting members 5 are connected to a locating arrangement 6 so that the multiple sea wave generating devices are located at a determined position. Preferably, the locating arrangement 6 is a lighting post on the sea. In addition, the generating assembly 2 is selectively and electrically connected to a power management installation 7 on the land. The power management installation 7 rectifies and transforms the voltage of the electric power from the generating assembly 2 and supplies the electric power to function facilities 8, such as lamps or the like.

Accordingly, the sea wave generating device floats on the sea to receive the sea wave. When the sea wave is introduced through the inlet flow channel 43 into the receiving chamber 44, the inlet flow channel 43 has a tapered shape to increase the flow speed of the seawater into the receiving chamber 44, so that the accelerated seawater impacts and drives the blade wheel 32 which drives the upper magnetic wheel 31 which magnetically drives the lower magnetic wheel 22 which drives the transmission set 24 which drives the power generator 23 so that the power generator 23 is operated to generate an electric power. In addition, the guiding housing 4 is removed from the floating base 1 easily and quickly to facilitate maintenance of the sea wave generating device. Further, the generating assembly 2 and the driving assembly 3 are modularized so that the generating assembly 2 and the driving assembly 3 are detached, dismantled, replaced and repaired easily and conveniently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A sea wave generating device comprising:
a floating base, a generating assembly, a driving assembly, and a guiding housing;
wherein:
the floating base includes a base body and a cover plate;
the base body defines a base chamber directed upward;
the cover plate is secured on a top of the base body and covers the base chamber;
the generating assembly includes a frame, a lower magnetic wheel pivotally mounted on the frame, a power generator mounted on the frame, and a transmission set mounted on the frame;
the frame is secured to a bottom of the base chamber;
the transmission set is connected between the lower magnetic wheel and the power generator;
the driving assembly includes an upper magnetic wheel pivotally mounted on a top of the cover plate, and a blade wheel secured on the upper magnetic wheel;
the upper magnetic wheel is arranged above the lower magnetic wheel and is coaxial with the lower magnetic wheel;
the upper magnetic wheel and the lower magnetic wheel are attracted magnetically with each other;
the blade wheel is coaxial with the upper magnetic wheel;
the guiding housing includes a housing body detachably secured to the base body;
the housing body has an inside provided with a guiding wall;
the guiding wall defines an inlet flow channel and a receiving chamber;
the inlet flow channel has a first end connected to an outside of the housing body and a second end connected to the receiving chamber;
the inlet flow channel tapers gradually from the outside of the housing body toward a side of the receiving chamber;
the housing body has a bottom provided with multiple first outlets;
the guiding wall has a bottom provided with a second outlet connected to the receiving chamber;
the bottom of the housing body rests on the cover plate closely;
the bottom of the guiding wall rests on the cover plate closely;
the driving assembly is mounted in the receiving chamber; and
the blade wheel has a periphery corresponding to an intersection of the inlet flow channel and the receiving chamber.

2. The sea wave generating device as claimed in claim 1, wherein:
the cover plate is bent or has a curved shape;
the cover plate is provided with a flow guide face;
the flow guide face is an inclined face or curved face;
the upper magnetic wheel is spaced from the flow guide face;
the bottom of the housing body has a shape mating with that of the cover plate;
the bottom of the housing body is bent or has a curved shape;
the bottom of the guiding wall has a shape mating with that of the cover plate;
the bottom of the guiding wall is bent or has a curved shape;
the inlet flow channel is arranged above and aligned with the flow guide face; and
the inlet flow channel has a tapering direction the same as an uphill direction of the flow guide face.

3. The sea wave generating device as claimed in claim 1, wherein the floating base further includes a waterproof seal strip secured to a bottom of the cover plate and closely resting on the top of the base body.

4. The sea wave generating device as claimed in claim 1, wherein the base body has two sides each provided with a flow guide wing.

5. The sea wave generating device as claimed in claim 1, wherein the guiding housing further includes a warning indicator mounted on the housing body.

6. The sea wave generating device as claimed in claim 1, wherein the floating base further includes multiple connectors mounted on the base body, and multiple sea wave generating devices are connected by multiple connecting members which connect the connectors of the multiple sea wave generating devices.

7. The sea wave generating device as claimed in claim 1, wherein:
the generating assembly further includes a voltage stabilizer mounted in the base chamber and an electric storage appliance mounted in the base chamber; and
the voltage stabilizer is electrically connected with the power generator and the electric storage appliance.

8. The sea wave generating device as claimed in claim 1, wherein the generating assembly is electrically connected to a power management installation.

* * * * *